United States Patent
Banthia et al.

[11] Patent Number: 5,981,630
[45] Date of Patent: Nov. 9, 1999

[54] FIBERS HAVING IMPROVED SINUSOIDAL CONFIGURATION, CONCRETE REINFORCED THEREWITH AND RELATED METHOD

[75] Inventors: Nemkumar Banthia, Burnaby, Canada; Richard E. Hingson, Ringgold, Ga.; Ashish Dubey, Vancouver, Canada

[73] Assignee: Synthetic Industries, Inc., Chickamauga, Ga.

[21] Appl. No.: 09/006,970

[22] Filed: Jan. 14, 1998

[51] Int. Cl.$^6$ ............................. E04C 5/00; B32B 27/00
[52] U.S. Cl. ................. 524/8; 106/703; 106/713; 106/727; 106/797; 106/823; 428/364; 428/369; 428/370; 428/371; 428/375; 428/378; 428/383; 428/400; 428/401; 428/606; 524/2; 524/7
[58] Field of Search ....................... 106/703, 713, 106/727, 797, 823; 428/364, 369, 370, 371, 375, 378, 383, 400, 401, 606; 524/2, 7, 8

[56] References Cited

U.S. PATENT DOCUMENTS

| | | | |
|---|---|---|---|
| 3,591,395 | 7/1971 | Zonsveld et al. | 106/99 |
| 3,645,961 | 2/1972 | Goldfein | 260/37 |

(List continued on next page.)

OTHER PUBLICATIONS

Banthia et al., "Concrete Reinforced With Deformed Steel Fibers Bond–Slip Mechanisms" *ACI Materials Journal*, V. 91, No. 5, Sep.–Oct., 1994.

*Primary Examiner*—Samuel A. Acquah
*Attorney, Agent, or Firm*—Renner, Kenner, Greive, Bobak, Taylor & Weber

[57] ABSTRACT

Fiber additives for addition to proportioned concrete comprise a plurality of thermoplastic fibers having a profile geometry defined by the equation, $$y = a_0 \sin\left(\frac{2\pi x}{\lambda}\right)$$

wherein the amplitude $a_0$ falls within a range of from about 0.1 $d_f$ to 2.0 $d_f$ and the period $\lambda$ falls within a range of from about 2 $d_f$ to 15 $d_f$ for fibers having a diameter $d_f$ of from about 0.5 to about 1 mm; the peak pull-out stress $\sigma_{peak}$ and the specific pull-out energy absorbed to a maximal displacement of 7.5 mm $\psi_{peak}$, both increase linearly with a deformity factor defined by the equation, $$D = a_o^\alpha \lambda^\beta$$

where $\alpha=0.8$ and $\beta=-1$, such that the peak pull-out stress is defined by the equation, $$\sigma_{peak} = \frac{4P_{peak}}{\pi d_f^2} = k_1 a_o^\alpha \lambda^\beta + C$$

and the specific pull-out energy is defined by the equation,

$$\psi_{peak} = \frac{4E_{peak}}{\pi d_f^2} = k_2 a_o^\alpha \lambda^\beta + C_1$$

the fiber additives having an optimimum deformity, $$D_{optimum} \approx (0.5 \text{ to } 1) D_{critical},$$

$D_{critical}$ being that deformity where the ultimate tensile strength of the fiber equals $k_1 D_{critical}+C$, and where loads are measured in N; energy in N-mm; length dimensions are in mm, and the values of $k_1$, $k_2$, C and $C_1$ are determined based upon the ultimate tensile strength of the fiber and by plotting deformation versus pull-out stress to obtain the value for $D_{critical}$. The present invention also provides concrete having improved crack resistance and a method for improving the bond slip performance of fibers in concrete utilizing the sinusoidally configured fibers of the present invention.

15 Claims, 4 Drawing Sheets

U.S. PATENT DOCUMENTS

| | | | |
|---|---|---|---|
| 4,414,030 | 11/1983 | Restrepo | 106/90 |
| 4,565,840 | 1/1986 | Kobayashi et al. | 524/8 |
| 4,585,487 | 4/1986 | Destree et al. | 106/99 |
| 5,443,918 | 8/1995 | Banthia et al. | 428/603 |
| 5,456,752 | 10/1995 | Hogan | 106/802 |
| 5,628,822 | 5/1997 | Hogan | 106/802 |

FIBERS HAVING IMPROVED SINUSOIDAL CONFIGURATION, CONCRETE REINFORCED THEREWITH AND RELATED METHOD

TECHNICAL FIELD

The present invention relates to the reinforcement of concrete and like products via the use of fibers. Synthetic and steel fibers have an established record in the reinforcement of concrete as an alternative to wire mesh and are successful in inhibiting shrinkage cracking, increasing impact capacity, reducing permeability, adding shatter resistance and reducing construction time. In particular, sinusoidally configured fibers are provided by the present invention, as are improved concrete mixtures reinforced thereby.

BACKGROUND ART

Concrete is a material which exhibits a low tensile strength and low fracture toughness. The ease with which cracks can nucleate and propagate in concrete under tension makes is imperative that concrete not be loaded in tension to the extent possible, and if unavoidable, some form of traditional reinforcement such as rebar be provided to take the tensile stresses. The latter is generally known as reinforced concrete and has been used for decades.

An alternate method of reinforcement is by incorporating short, randomly distributed fibers in concrete such that reinforcement throughout the volume is provided, and entirely new composite material is obtained. Fiber reinforced concrete is found to have significantly improved energy absorption capability (often called toughness), impact resistance and fatigue endurance, and its greater resistance to cracking also imparts it better durability and aesthetics.

U.S. Pat. No. 4,565,840 provides fiber reinforced concrete comprising from one to six percent by volume of a mixture of short steel fibers.

The addition of fibrillated plastic filaments to cement mortar is disclosed in U.S. Pat. No. 4,414,030. Such fibrillated filaments comprise ribbons having a length of up to 50 millimeters long and are said to be split apart during mixing with the mortar components to provide a random distribution of separate reinforcing plastic filaments throughout the mortar.

The use of discrete fibers in the reinforcement of concrete is set forth in U.S. Pat. No. 3,645,961. The patent discloses the use of nylon, polyvinyl chloride and simple polyolefins in lengths ranging between one-quarter to three inches (0.6 to 7.5 cm) to form a blast resistant concrete.

The use of fibrous materials made from nylon, polypropylene, poly-vinylidene chloride and polyethylene is set forth in U.S. Pat. No. 3,645,961. Less than 3 percent of these fibers in lengths from ¼ to 3 inches (0.6 to 7.5 cm) can be mixed into concrete to make blast-resistant structures.

The use of fibrillated polypropylene fibers from 0.05 to 2 percent by weight of the total wet mixture of water-hardenable inorganic materials is presented in U.S. Pat. No. 3,591,395.

U.S. Pat. Nos. 5,456,752 and 5,628,822, owned by the Assignee of record, teach the use of graded synthetic fibers for the reinforcement of concrete. Gradation provides a plurality of different fiber types, i.e., lengths, deniers, widths, thicknesses, aspect ratios, cross-sections and fibrillations, in a controlled mixture adapted to accommodate the mortar factions in proportioned concrete.

According to the present invention, it is now understood that for a proper bond with the cementitious matrix around it, the fibers destined for concrete reinforcement must be deformed in geometry. However, most deformations put on commercial fibers are "ad-hoc" and little knowledge of what exactly constitutes an optimal deformation exists. The first attempt to rationally deform fibers was described is U.S. Pat. No. 5,443,918, which discloses metal fibers e.g., steel, having an elongated, substantially straight central portion and sinusoidally shaped end portions for addition to and reinforcement of cement-based material.

U.S. Pat. No. 4,585,487 discloses filiform or thread-like elements (fibers) of steel wire having uniform corrugations along their entire length for the reinforcement of concrete.

Bond-slip characteristics of fibers determined using a pull-out test (Banthia et al, "Concrete Reinforced with Deformed Steel Fibers, Part 1: Bond-slip Mechanisms" *ACU Materials Journal*, V. 91, No. 5, September–October 1994) are a wellaccepted way of assessing the performance of fibers in the composite.

The use of polymeric fibers (especially polypropylene) has to date remained limited to control of plastic shrinkage cracking in freshly placed concrete resulting from loss of mix and bleed water through evaporation. Given their non-structural purpose, the volume fractions of fibers used in these applications have also remained low (approximately 0.1%). The load carrying capacity of plain concrete without fiber reinforcement or that of concrete carrying a minimal amount of polypropylene fiber reinforcement (approximately 0.1% by volume) beyond matrix cracking is essentially zero. Lately though there have been some attempts to introduce greater volume fractions (about 1%) of larger diameter polypropylene fiber into concrete. These fibers have brought polymeric materials into the category of "structural" fibers where the purpose is not so much to control plastic shrinkage cracking, but also to improve the toughness, energy absorption capability and the load carrying capacity of concrete beyond first matrix cracking.

These new generation of "structural" polypropylene fibers are, however, straight and undeformed. As a result, they develop a poor bond with the surrounding matrix and are not very efficient. What is not known to-date, however, is what constitutes an optimal deformation for a low modulus material as polypropylene. Such an optimal deformation is the subject of the present invention.

DISCLOSURE OF THE INVENTION

It is therefore an object of the present invention to provide an improved reinforcing fiber for concrete, more particularly, an improved fiber geometry for reinforcing cement-based composites produced through casting methods or shotcreting methods.

It is another object of the present invention to provide sinusoidally configured fibers optimally configured for reinforcing concrete and like materials.

It is another object of the present invention to provide concrete and like materials having improved crack resistance, impact capacity, and shatter resistance.

It is yet another object of the present invention to provide an improved method for reinforcing concrete and like materials.

At least one or more of the foregoing objects, together with the advantages thereof over the known fiber additives for concrete mixtures, which shall become apparent from the specification which follows, are accomplished by the invention as hereinafter described and claimed.

In general, the present invention provides fiber additives for addition to proportioned concrete comprising a plurality of thermoplastic fibers having a profile geometry defined by the equation $$y = a_0 \sin\left(\frac{2\pi x}{\lambda}\right)$$

wherein the amplitude $a_0$ falls within a range of from about 0.1 $d_f$ to 2 $d_f$ and the period $\lambda$ falls within a range of from about 2 $d_f$ to 15 $d_f$ for fibers having a diameter $d_f$ of from about 0.5 to about 1 mm; the peak pull-out stress $\sigma_{peak}$ and the specific pull-out energy absorbed to a maximal displacement of 7.5 mm $\psi_{peak}$, both increase linearly with a deformity factor defined by the equation, $$D = a_o^\alpha \lambda^\beta$$

where $\alpha=0.8$ and $\beta=-1$, such that the peak pull-out stress is defined by the equation, $$\sigma_{peak} = \frac{4P_{peak}}{\pi d_f^2} = k_1 a_o^\alpha \lambda^\beta + C$$

and the specific pull-out energy is defined by the equation, $$\psi_{peak} = \frac{4E_{peak}}{\pi d_f^2} = k_2 a_o^\alpha \lambda^\beta + C_1$$

the fiber additives having an optimum deformity, $$D_{optimum} \approx (0.5 \text{ to } 1) D_{critical},$$

$D_{critical}$ being that deformity where the ultimate tensile strength of the fiber equals $$k_1 \, D_{critical} + C$$

and where loads are measured in N; energy in N-mm; length dimensions are in mm, and the values of $k_1$, $k_2$, C and $C_1$ are determined based upon the ultimate tensile strength of the fiber and by plotting deformation versus pull-out stress to obtain the value for $D_{critical}$.

The present invention also provides concrete having improved crack resistance comprising concrete; and from about 0.25 to about 5 percent by volume of sinusoidally configured thermoplastic fibers having a profile geometry defined by the equation, $$y = a_0 \sin\left(\frac{2\pi x}{\lambda}\right)$$

wherein the amplitude $a_0$ falls within a range of from about 0.1 $d_f$ to 2 $d_f$ and the period $\lambda$ falls within a range of from about 2 $d_f$ to 15 $d_f$ for fibers having a diameter $d_f$ of from about 0.5 to about 1 mm; the peak pull-out stress $\sigma_{peak}$ and the specific pull-out energy absorbed to a maximal displacement of 7.5 mm $\psi_{peak}$, both increase linearly with a deformity factor defined by the equation, $$D = a_o^\alpha \lambda^\beta$$

where $\alpha=0.8$ and $\beta=-1$, such that the peak pull-out stress is defined by the equation, $$\sigma_{peak} = \frac{4P_{peak}}{\pi d_f^2} = k_1 a_o^\alpha \lambda^\beta + C$$

and the specific pull-out energy is defined by the equation, $$\psi_{peak} = \frac{4E_{peak}}{\pi d_f^2} = k_2 a_o^\alpha \lambda^\beta + C_1$$

the fiber additives having an optimum deformity, $$D_{optimum} \approx (0.5 \text{ to } 1) D_{critical},$$

$D_{critical}$ being that deformity where the ultimate tensile strength of the fiber equals $$k_1 \, D_{critical} + C$$

and where loads are measured in N; energy in N-mm; length dimensions are in mm, and the values of $k_1$, $k_2$, C and $C_1$ are determined based upon the ultimate tensile strength of the fiber and by plotting deformation versus pull-out stress to obtain the value for $D_{critical}$.

The present invention further provides a method for improving bond slip performance of fibers in concrete comprising the steps of adding to a selected amount of concrete, from about 0.25 to about 5 percent by volume, of sinusoidally configured thermoplastic fibers having a geometry defined by the equation, $$y = a_0 \sin\left(\frac{2\pi x}{\lambda}\right)$$

wherein the amplitude $a_0$ falls within a range of from about 0.1 $d_f$ to 2 $d_f$ and the period $\lambda$ falls within a range of from about 2 $d_f$ to 15 $d_f$ for fibers having a diameter $d_f$ of from about 0.5 to about 1 mm; the peak pull-out stress $\sigma_{peak}$ and the specific pull-out energy absorbed to a maximal displacement of 7.5 mm $\psi_{peak}$, both increase linearly with a deformity factor defined by the equation, $$D = a_o^\alpha \lambda^\beta$$

where $\alpha=0.8$ and $\beta=-1$, such that the peak pull-out stress is defined by the equation, $$\sigma_{peak} = \frac{4P_{peak}}{\pi d_f^2} = k_1 a_o^\alpha \lambda^\beta + C$$

and the specific pull-out energy is defined by the equation, $$\psi_{peak} = \frac{4E_{peak}}{\pi d_f^2} = k_2 a_o^\alpha \lambda^\beta + C_1$$

the fiber additives having an optimum deformity, $$D_{optimum} \approx (0.5 \text{ to } 1) D_{critical},$$

$D_{critical}$ being that deformity where the ultimate tensile strength of the fiber equals $$k_1 \, D_{critical} + C$$

and where loads are measured in N; energy in N-mm; length dimensions are in mm, and the values of $k_1$, $k_2$, C and $C_1$ are determined based upon the ultimate tensile strength of the fiber and by plotting deformation versus pull-out stress to obtain the value for $D_{critical}$; and mixing the components sufficiently to distribute the fibers uniformly throughout the concrete, whereby energy absorption capability of concrete is improved as compared to concrete reinforced by fibers having a geometry other than the geometry of the sinusoidally configured fibers.

PREFERRED EMBODIMENT FOR CARRYING OUT THE INVENTION

Practice of the present invention recognizes that concrete is a compound which exhibits in cross-section, coarse aggregate surrounded by various mortar factions. These mortar factions are composed of cement paste and fine aggregate. It is the cement paste that undergoes shrinkage during the hydration process. This volume change results in the formation of shrinkage cracks. Residual strength is only appreciated and can be measured after some external force causes concrete to crack. These cracks will randomly interrupt the continuity of the paste areas. The present invention recognizes that when all areas prone to cracking are reinforced, the post crack residual strength will be optimized. Microcracks are restricted from gaining energy and coalescing into macrocracks by the presence of optimally configured fiber reinforcement. As a result, the hardened concrete characteristics are improved with greater impact, abrasion and shatter resistance and lower permeability.

The present invention then relates to a specific configuration of synthetic reinforcing fibers which can be utilized for the reinforcement of concrete and like materials and is readily dispersable therewith. More particularly, the synthetic fibers are designed to provide a specific, sinusoidal configuration which has been optimally configured for use in the reinforcement of concrete. The present invention provides a specific configuration of fibers which can be blended more rapidly and thoroughly into all types of concrete mixtures including but not limited to, precast products, mortar, grout, shotcrete, cast-in-place concrete, stucco and the like, all of which generally comprise hardenable cement-like materials. The terms concrete, concrete materials or concrete mixtures shall be employed herein with the understanding that all types of concrete products are included such as those listed hereinabove.

Useful fibers for practice of the present invention comprise synthetic materials namely, thermoplastics including polyolefins, such as polyethylene and polypropylene; polyesters; polyvinyl chloride; polyvinylidene chloride; polyamides including aromatic polyamides, such as KEVLAR®; polyacrylics, and mixtures thereof. The thermoplastic fibers can be 100 percent homopolymer, they can comprise copolymers and polymer blends. Additionally, they can be functionalized, filled, coated including metallic coatings or otherwise modified. In general, substantially any thermoplastic composition that can be utilized to form monofilaments can be employed so long as it can be sinusoidally configured and, it can be added to concrete. A fiber can be referred to by its polymeric name e.g., polypropylene, if it is at least primarily polypropylene rather than comprising 100 percent polypropylene. In other words, selection of the thermoplastic polymer does not constitute a limitation of the present invention. Practical considerations for fiber selection include creep resistance, a strong trait of polyesters, and dispersibility of the fiber in the concrete mixture, although the absence of either one of these properties should not eliminate a particular polymer. Typically, thermoplastic fibers having specific gravities ranging from about 0.80 to 1.96 are suitable.

Figure 1:
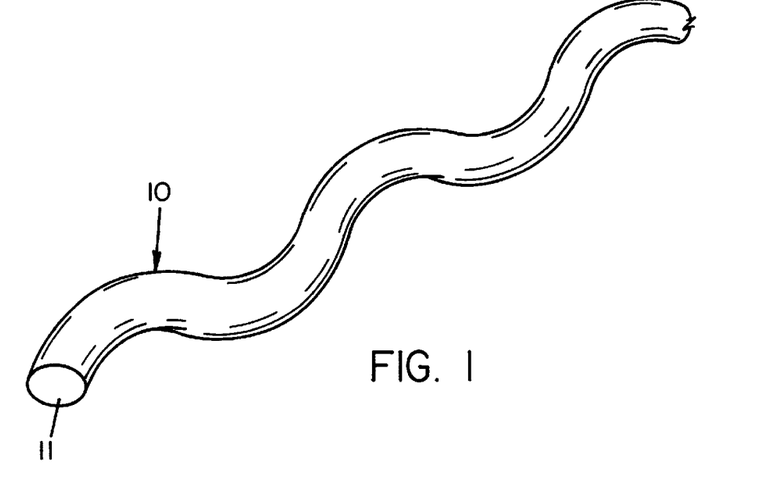
FIG. 1 is an enlarged perspective view of a sinusoidally configured fiber according to the present invention.
Figure 2:
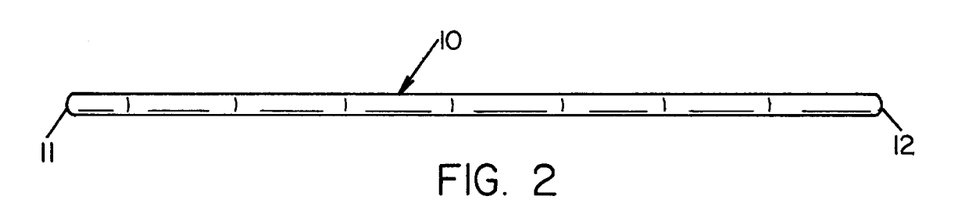
FIG. 2 is a plan view of the sinusoidally configured fiber of FIG. 1.
Figure 3:
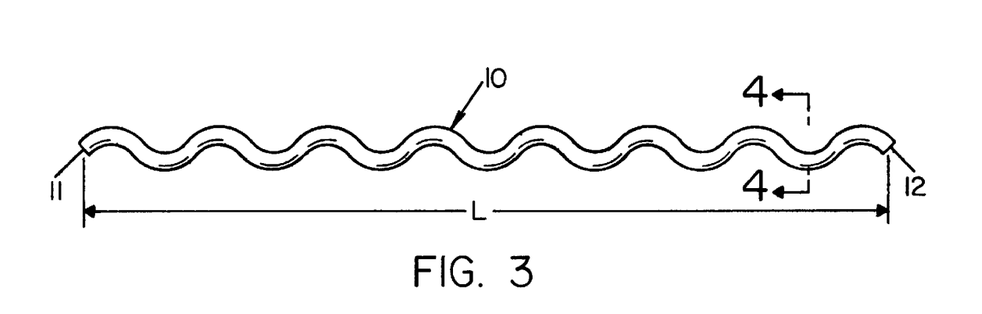
FIG. 3 is a side elevation of the sinusoidally configured fiber of FIG. 1.
Figure 4:
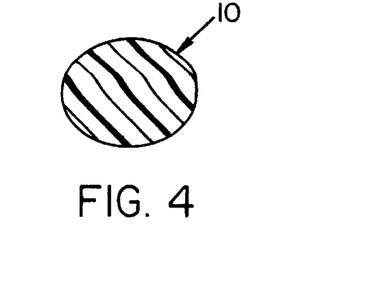
FIG. 4 is a section taken substantially along the lines 4—4 of FIG. 3.
Figure 6:
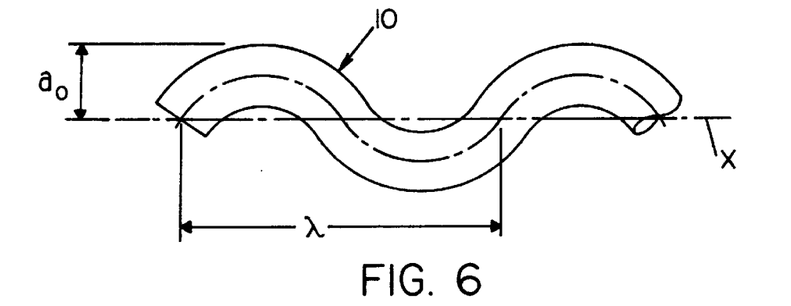
FIG. 6 is a mathematical curve depicting the repeating sinusoids of a fiber according to the present invention presenting the amplitude and period of each sinusoid.

In particular, polypropylene fibers are preferred and have been exemplified herein to demonstrate practice of the present invention. Using these fibers as exemplary, reference can be made to the drawing figures. In FIG. 1, the sinusoidal configuration of a fiber, indicated generally by the numeral 10, is depicted on a greatly enlarged scale. The fiber is essentially straight along its length from end 11 to the other 12, as depicted in FIG. 2, and has a sinusoidal configuration as depicted in FIG. 3. As an aside, the sinusoidal configuration depicted in FIGS. 1–3 has been scaled for a preferred length of fiber of about three centimeters. The cross-section of the fiber 10 is shown to be as oval, depicted in FIG. 4, however, other cross-sections, such as circular, rectangular, square and the like are also within the scope of the present invention. Unlike existing fibers, having a similar configuration, the sinusoidal configuration of the fiber 10 is depicted in FIG. 6. As can be seen, the fiber 10 has a profile amplitude $a_0$ above and below an axis X and a period $\lambda$, representing one complete sinusoidal curve. Recognizing that FIG. 6 is not necessarily to scale, it will be appreciated that as the values for $a_0$ and $\lambda$, as well as the diameter of the fiber, are varied, the profile of the fiber will likewise vary.

The fiber has a crimped (repeated sinusoids) geometry. The geometry is mathematically represented by an equation of the type:

$$y = a_0 \sin\left(\frac{2\pi x}{\lambda}\right) \qquad \text{Equation 1}$$

Equation 1
Where $a_0$ represents the profile amplitude of the sinusoidal curve and $\lambda$ is the period over which the sinusoidal curve repeats itself, as depicted in FIG. 1.

The value of the fiber as an additive to reinforce concrete is in the increased force and energy expended to pull the bonded fiber from the concrete which is, in turn, limited by the ultimate tensile strength (UTS) of the fiber. That is, the pull-out stress should be sufficiently high to fall just below the UTS, where the fiber fails and can no longer resist the separation between previously continuous sections of concrete.

In a pull-out test, carried out to assess the bond-slip performance of a given fiber bonded in cement, the peak pull-out stress is defined by the equation, $$\sigma_{peak} = \frac{4P_{peak}}{\pi d_f^2} \qquad \text{Equation 2}$$

Equation 2
where $P_{peak}$ is the maximum pull-out load attained in a pull-out test and $d_f$ is the fiber diameter. Similarly, the specific pull-out energy, absorbed to a maximal displacement of 7.5 mm is defined by the equation, $$\psi_{peak} = \frac{4E_{peak}}{\pi d_f^2} \qquad \text{Equation 3}$$

Equation 3
where $E_{peak}$ is the pull-out energy absorbed in a pull-out test to a maximal displacement of 7.5 mm and $d_f$ is the fiber diameter.

Accordingly, the peak pull-out stress $\sigma_{peak}$ and the specific pull-out energy $\psi_{peak}$, absorbed to a maximal displacement of 7.5 mm, both increase linearly with a deformity factor defined by the equation, $$D = a_o^\alpha \lambda^\beta \qquad \text{Equation 4}$$

Equation 4
where $\alpha 0.8$ and $\beta = -1$, such that the peak pull-out stress is defined by the equation, $$\sigma_{peak} = \frac{4P_{peak}}{\pi d_f^2} = k_1 a_o^\alpha \lambda^\beta + C \qquad \text{Equation 5}$$

Equation 5
and the specific pull-out energy is defined by the equation, $$\psi_{peak} = \frac{4E_{peak}}{\pi d_f^2} = k_2 a_o^\alpha \lambda^\beta + C_1 \qquad \text{Equation 6}$$

Equation 6
We have known only qualitatively that for a given range of fiber diameter, the independent variables such as fiber amplitude and fiber period both influence the pull-out performance defined by the dependent objective functions $P_{peak}$ and $E_{peak}$. What has not been known heretofore is one function namely, the Deformity factor D (equation 4), which combines both amplitude and period and is linearly related to both objective functions $P_{peak}$ and $E_{peak}$ such that both of these can be simultaneously maximized.

While Equations 5 and 6 are valid for any material and any crimped geometry defined by Equation 1, for the particular case of polypropylene fibers with a UTS of 450 MPa, the following constants were obtained in the broad diameter range of 0.5 to 1 mm: $k_1$=2300; $k_2$=12300; C=27.5 and, $C_1$=186, where loads are measured in N, energy in N-mm, and all length dimensions are in mm. In addition, constants $k_1$ and $k_2$ provide the slope of curves that can be drawn representing pull-out stress and pull-out energy respectively, for a sinusoidally configured fiber according to the present invention embedded in concrete, plotted against the deformity factor for that fiber, while the constants C and $C_1$ represent the pull-out stress and pull-out energy respectively, for an undeformed, or straight, fiber embedded in concrete, plotted against the deformity factor, both of which will be discussed in greater detail hereinbelow.

Conceptually, the constants C and $C_1$ are, respectively, the peak stress and the specific energy values for the straight undeformed fiber (D=0). A linear increase in the stress with an increase in D implies that after attaining a certain value of D, ($D_{critical}$), a fiber during pull-out would attain stresses approaching the ultimate tensile strength and at that point fiber fracture would occur as opposed to a fiber pull-out; the latter being a preferred mode of failure from energy absorption point of view. If this happens, the specific energy absorption values would decrease substantially. The value or deformity $D_{critical}$ is that deformity D where $$\text{UTS} = k_1 D_{critical} + C \qquad \text{Equation 7.}$$

For practice of the present invention, the fiber should have an optimum deformity, $D_{optimum}$, which is from about 0.5 up to about 1 of $D_{critical}$. That is, $$D_{optimum} \approx (0.5 \text{ to } 1) D_{critical} \qquad \text{Equation 8.}$$

Recognizing that $D_{critical}$ is the deformity value at fiber failure, $D_{optimum}$ is preferably a value just below $D_{critical}$, as the efficiency of the fibers 10 as a secondary reinforcement for concrete increases as $D_{optimum}$ approaches $D_{critical}$.

For other useful thermoplastic polymeric materials, such as polyolefins, PVC, polyvinylidene chloride, polyamides, polyacrylics, and the like, one can easily determine the values for the foregoing constants with minimal experimental effort. Generally, for any other thermoplastic fiber, one would test the fibers in pull-out tests, in the manner described hereinbelow, and plot at least two deformity factors versus fiber stress, from which the optimal geometry can then be extrapolated to obtain the values for the constants $k_1$ and C. With knowledge of the constants, one can determine $D_{critical}$ and $D_{optimum}$ according to equations 7 and 8.

In the experimental evaluation, fibers with various diameters, amplitudes, and periods were tested and the direct correlation between the deformity D and the peak pull-out stress $\sigma_{peak}$ as well as the direct correlation between the deformity D and the specific pull-out energy absorbed to a maximal displacement of 7.5 mm $\psi_{peak}$ (given by equations 5 and 6, respectively) was confirmed (see FIGS. 8 and 9, which will be discussed hereinbelow).

As noted hereinabove, the fibers 10 can be polymeric. Preferred lengths for fibers range from about 10 to about 60 mm. Similarly, diameters for the fibers range from about 0.5 to about 1 mm. Preferred ranges are expressed hereinbelow with ranges for period and amplitude.

Figure 5:
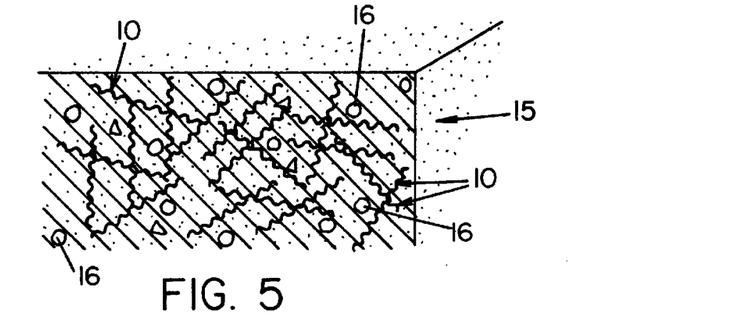
FIG. 5 is a perspective view of a partial slab of concrete, presenting a cross-section depicting the aggregate and fibers of the present invention therein.

Addition of the sinusoidally configured fibers of the present invention to concrete mixtures and similar materials is generally higher than for conventional shrinkage controlling fibers and merely requires that the quantity be incorporated during mixing and prior to pour or use. Reference can be made here to FIG. 5, schematically depicting the random distribution of fibers 10 in concrete, providing a novel reinforced concrete product 15 also containing aggregate 16. Generally, it is desirable to add the sinusoidally configured fibers of the present invention at the rate of about 0.25 to about 5 percent by volume which, depending upon density of the fiber material, represents about 0.225 to 4.5 kg for polypropylene, per cubic meter of concrete. Similarly, the method of the present invention for improving the crack resistance of concrete and concrete materials includes the steps of adding the sinusoidally configured fibers, as described herein, to the concrete, and then mixing the components together sufficiently to disperse the fibers thoroughly within the concrete material.

In order to demonstrate the effectiveness of the sinusoidally configured fibers of the present invention as a secondary reinforcement for concrete, tests were conducted involving the addition of polypropylene fibers followed by measurement of peak pull-out stress and specific pull-out energy.

Testing was conducted to compare concrete containing sinusoidally configured synthetic fibers 10 e.g., polypropylene, with concrete containing non-configured fibers and ad-hoc, or existing, configured fibers. Samples were prepared and tested according to good concrete practices using ASTM standards and procedures. For a complete description of the test, reference may be made to Banthia et al, "Concrete Reinforced with Deformed Steel Fibers, Part 1: Bond-slip Mechanisms" (supra), the contents of which are incorporated herein by reference. The mix proportions are given in Table I. Properties of the concrete, both fresh as well as hardened after 28 days, are presented in Table II.

TABLE I

MIX PROPORTIONS

| Ingredient | kg/m³ |
|---|---|
| Cement | 400 |
| Water | 200 |
| Sand | 1000 |
| Aggregate | 800 |
| Air Entraining Admixture | 0.1 ml/kg of cement |

TABLE II

CONCRETE PROPERTIES

FRESH

| Slump | Air Content | Vee-Bee Time |
|---|---|---|
| 160 mm | 4.50% | 2.3 Seconds |

HARDENED

| Compressive Strength (MPa) | Modulus of Rupture (MPa) |
|---|---|
| 37 | 4.8 |

Figure 7:
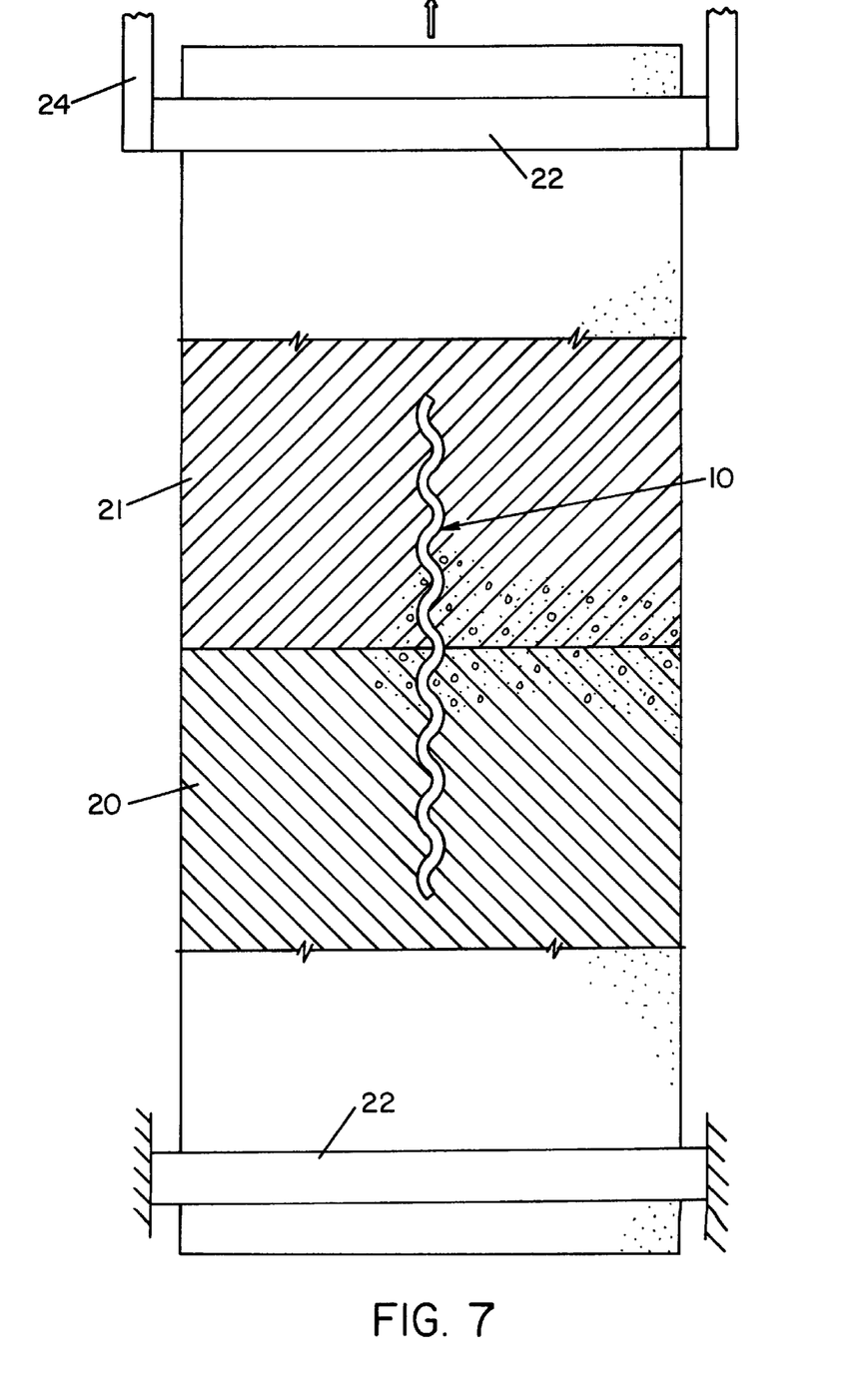
FIG. 7, is a side elevation depicting concrete specimens cast in two parts with a fiber according to the present invention embedded therein for testing purposes

The pullout tests were performed with specimens as depicted in FIG. 7 using a 150-kN floor mounted testing machine, manufactured by Instron Corporation, Canton, Mass. The specimens were cast in two parts or blocks, 20 and 21. Each had an anchor ring 22 embedded into one end when the blocks were cast, providing an annular ring for gripping by the instrument. The lower block 20 was cast first with the fiber being tested embedded in it and allowed to cure for 24 hours. The fiber 10 of the present invention is depicted, however the same procedure was employed for testing prior art fibers. Once hardened, a plastic separator 23 was placed on top of the first block 20 and concrete was poured to form the upper block 21 and the assembly was further cured for a period of 28 days until tested. Pullout tests were performed in the 150-kN testing machine. Load was applied by holding the lower ring 22 in block 20 and pulling the upper ring 22 in block 21 via jaws, depicted schematically at 24, so as to separate the blocks 20 and 21, at a cross-arm travel rate of 0.5 mm/min and the applied load-versus-fiber slip curves were recorded. Fiber slips were measured by two LVDT transducers (one coarse with a total travel of 25 mm and the other fine with a total travel of 1 mm). The load and slip data were digitally recorded using a 16-bit data acquisition system operating at a frequency of 10 Hz. The fine LVDT facilitated accurate measurements in the initial elastic portion of the load-versus-slip curve, where the expected slips were only a small fraction of a millimeter.

Figure 8:
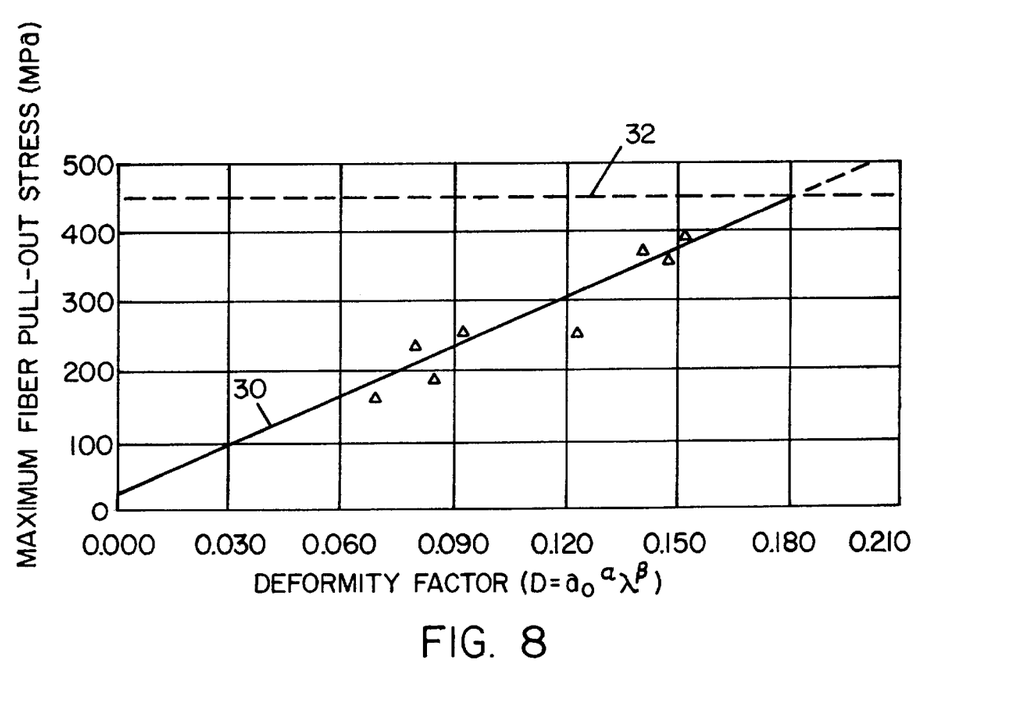
FIG. 8, is a graph depicting pull-out stress for a fiber according to the present invention, in concrete, plotted against the deformity factor.

With reference to FIG. 8, maximum fiber pull-out stress, measured in MPa, has been plotted against the deformity factor defined in equation 4 hereinabove for a polypropylene fiber having a UTS of 450 MPa. It is seen that the stress increases generally linearly, line 30, for a curve drawn between actual data points from a deformity factor of 0 to the UTS, line 32 and, that at a near maximum deformity of 0.15, the pull-out stress is about 400 MPa, a significant increase over a straight fiber. More importantly, at a point just beyond 0.18 along the x-axis, the maximum deformity $D_{critical}$ is reached where the line 30 crosses the UTS of the fiber, line 32. Accordingly, for this fiber, the range of about (0.5 to 1) $D_{critical}$ for the values of $D_{optimum}$ is equal to a deformity factor of from about 0.09 to about 0.18 (FIG. 8).

Figure 9:
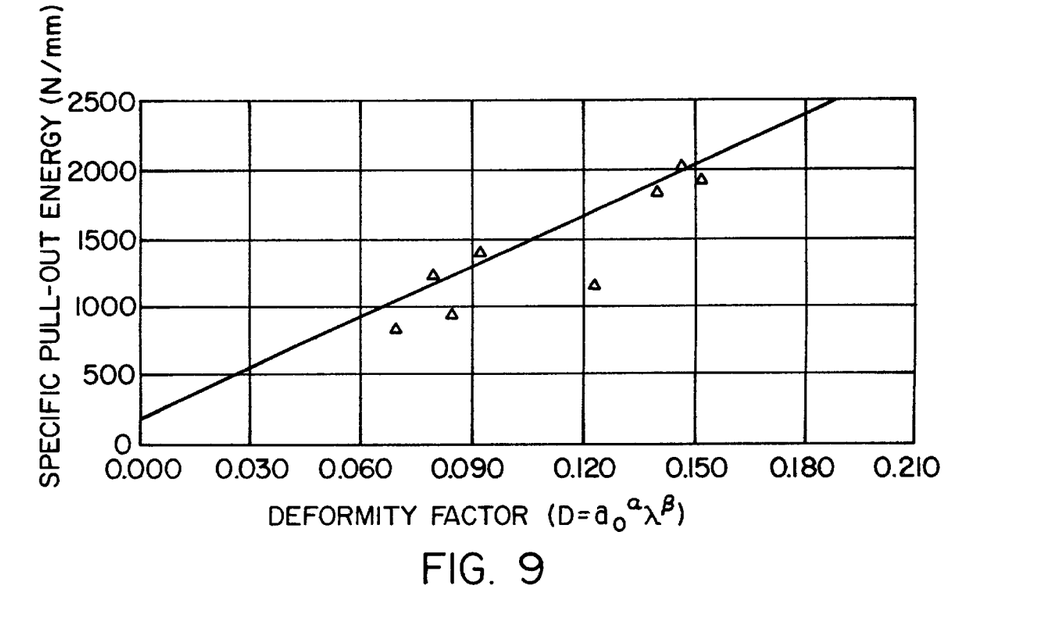
FIG. 9 is a graph depicting pull-out energy for a fiber according to the present invention, in concrete, plotted against the deformity factor.

With reference to FIG. 9, specific fiber pull-out energy, measured in N/mm, has been plotted against the deformity factor defined in equation 4 hereinabove. It is seen that the energy increases generally linearly, line 35, for a curve drawn between actual data points from a deformity factor of 0 to a maximum deformity of 0.15, providing a pull-out energy of about 2000 N/mm, again a significant increase over a straight fiber.

Based on this understanding, the criterion emerged that for an optimal fiber performance, the fiber should be deformed to a deformity factor, $D_{optimal}$, such that it develops an average peak pull-out load of just under its peak pull-out capacity at fracture, determined by deformity factor $D_{critical}$. Accordingly, the patent covers the following general fiber deformation characteristic ranges:

| Diameter ($d_f$): | 0.5 to 1 mm |
|---|---|
| Amplitude ($a_o$): | 0.1 $d_f$ to 2 $d_f$ |
| Period (λ) | 2 $d_f$ to 15 $d_f$ |

More specifically, the ranges are:

| Diameter ($d_f$): | 0.6 to 0.8 mm |
|---|---|
| Amplitude ($a_o$): | 0.5 $d_f$ to 1 $d_f$ |
| Period (λ) | 4 $d_f$ to 7 $d_f$ |

Most specifically, the values are:

| Diameter ($d_f$): | 0.76 mm |
|---|---|
| Amplitude ($a_o$): | 0.52 mm |
| Period (λ) | 3.9 mm. |

While the diameter, amplitude or period of existing crimped fibers may fall within one of the general fiber deformation characteristic ranges set forth hereinabove for diameter, amplitude or period respectively, none of the existing fiber configurations prior to the present invention have satisfied the conditions of the optimal deformity factor $D_{optimum}$, discussed hereinabove. Accordingly, for a given fiber diameter ($d_f$) of 0.76 mm, the amplitude ($a_0$) will be 0.52 mm, and the period (λ) will be 3.9 mm. In other words, for any other selected fiber diameter within the general range of 0.5 to 1 mm, there will be a specific amplitude and period that will satisfy the optimal deformity factor, $D_{optimum}$; just as for any selected amplitude within the general range of 0.1 ($d_f$) to 2 ($d_f$), there will be a specific fiber diameter and period that will satisfy the the optimal deformity factor, $D_{optimum}$; and, for any selected period within the general range of 2 ($d_f$) to 15 ($d_f$), there will be a specific fiber diameter and amplitude that will satisfy the the optimal deformity factor, $D_{optimum}$.

Figure 10:
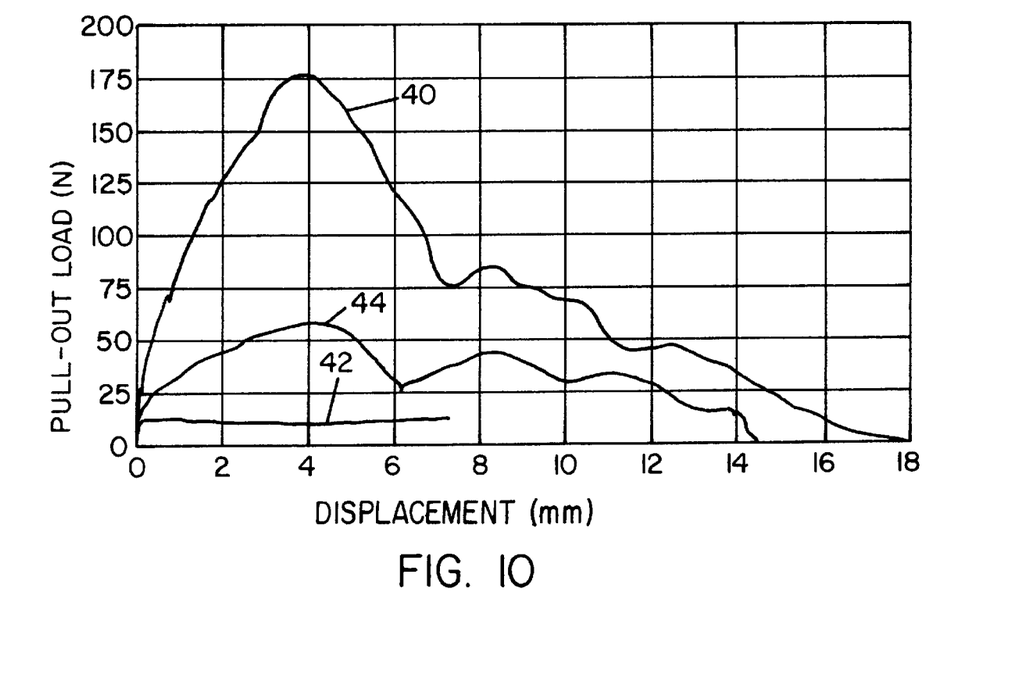
FIG. 10 is a graph depicting a comparison of pull-out characteristics for a fiber according to the present invention versus an ad-hoc crimped fiber and a straight fiber.

A bond-slip curve 40 for the fibers 10 with the above characteristics is given in FIG. 10. A comparison with a straight, undeformed fiber is also given, plotted as curve 42. For further comparison, the performance of an ad-hoc crimped fiber has been plotted as curve 44. Such fibers were generally sinusoidally configured also, but not within the optimum diameter, amplitude and period ranges for the fibers 10 necessary to satisfy the optimal deformity factor. Accordingly, the optimum deformity $D_{optimum}$, for the ad-hoc fibers is less than 0.5 $D_{critical}$ and was, in fact, only (0.029) $D_{critical}$. It is also seen that a significant increase in the peak load-carrying capacity as well as the energy absorption capacity (area under the curve) occurred due to the proposed deformations.

As is apparent from consideration of the data in FIGS. 8–10, the use of sinusoidally configured fibers, developing the peak pull-out stress and specific pull-out energy, as defined by the equations 5 and 6, provided better properties than the use of the straight length fibers and ad-hoc crimped fibers of the prior art.

In order to design a fiber according to the present invention having an optimum deformity, one can select two diameters, amplitudes and periods within the ranges of the present invention and using these, solve for D using equation 4, the values for α and β being known. Next, each fiber having a specific set of diameter, amplitude and period values, would be cast within concrete blocks and subjected to pull-out testing to determine values for pull-out stress and pull-out energy. This data will provide two points for plotting. Where the pull-out stress is plotted, a line similar to line 30 in FIG. 8 will be provided and where the line crosses the y-axis, (D=0), the value for the first constant C can be determined while $k_1$ is the slope of the new line 30. Similarly, where the pull-out energy is plotted, a line similar to line 35 in FIG. 9 will be provided and where the line crosses the y-axis, (D=0), the value for the second constant $C_1$ can be determined while $k_2$ is the slope of the new line 35. With these values, all four of the constants $k_1$, $k_2$, C and $C_1$ are known and with $k_1$ and C, $D_{critical}$ and $D_{optimum}$ can be determined, as noted hereinabove. With knowledge of the latter values, one can then determine the range of values for $D_{optimum}$ according to equation 8.

Determining if a particular fiber having a sinusoidal configuration provides optimum deformity, $D_{optimum}$, for use according to the present invention, is a relatively straightforward procedure. First, the diameter, amplitude and period of the fiber can be measured, which should fall within at least the broad general fiber deformation characteristic ranges stated hereinabove, if not one of the more preferred ranges disclosed. Also, the ultimate tensile strength of the fiber should be determined. This fiber should then be subjected to pull-out testing to determine values for pull-out stress and pull-out energy. The results can be plotted as data points on two separate graphs, similar to FIGS. 8 and 9, for pull-out stress and pull-out energy respectively. Next, the fiber should be straightened i.e., the sinusoidal configuration should be removed. It will be recalled that the constants C and $C_1$ are those values for straight fibers (zero deformity).

When this fiber is then subjected to pull-out testing to determine values for pull-out stress and pull-out energy, two additional data points, each lying on the y-axis for graphs similar to FIGS. 8 and 9, are provided through which lines (30) and (35) can be drawn. Finally, with reference to the newly created graph plotting pull-out stress versus deformity, similar to FIG. 8, the ultimate tensile strength should be added so as to determine the value for $D_{critical}$, from which $D_{optimum}$ can be determined. If the actual value for the pull-out stress falls within the range for $D_{optimum}$, the fiber provides optimum deformity.

In addition, the fiber can also be somewhat elongated, which will vary the period and amplitude, and these values with the given diameter can be utilized to solve for D, again using equation $_4$. The elongated fiber can be itself subjected to pull-out testing so as to provide a further data point plotted against the deformity factor, which data point should also fall upon the newly created line (30) or at least within experimental error thereof.

Based upon the foregoing disclosure, it should now be apparent that the present invention carries out the objects set forth hereinabove. It should also be apparent to those skilled in the art that a wide variety of fiber compositions can be employed and while the use of polypropylene fiber is preferred, it is to be understood that the present invention should not be limited thereto, as other fibers can be substituted. Similarly, the determination of the optimal sinusoidal fiber configuration can be determined from the total disclosure provided herein in order to fall within the optimum deformity $D_{optimum}$, of equation 8. Likewise, the use of specific amounts of any particular fiber, or of the volume of the fibers added to the concrete, does not constitute a limitation on the present invention.

It is, therefore, to be understood that any variations evident fall within the scope of the claimed invention and thus, the selection of specific fibers, sinusoidal configurations and amounts can be determined without departing from the spirit of the invention herein disclosed and described. Moreover, the scope of the invention shall include all modifications and variations that may fall within the scope of the attached claims.

What is claimed is:

1. Fiber additives for addition to concrete comprising:

a plurality of thermoplastic fibers having a profile geometry defined by the equation, $$y = a_0 \sin\left(\frac{2\pi x}{\lambda}\right)$$

wherein the amplitude $a_0$ falls within a range of from about 0.1 $d_f$ to 2 $d_f$ and the period λ falls within a range of from about 2 $d_f$ to 15 $d_f$ for fibers having a diameter $d_f$ of from about 0.5 to about 1 mm; the peak pull-out stress $\sigma_{peak}$ and the specific pull-out energy absorbed to a maximal displacement of 7.5 mm $\psi_{peak}$, for said fibers, when embedded in concrete, both increase linearly with a deformity factor defined by the equation, $$D = a_o^\alpha \lambda^\beta$$

where α=0.8 and β=−1, such that the peak pull-out stress is defined by the equation, $$\sigma_{peak} = \frac{4P_{peak}}{\pi d_f^2} = k_1 a_o^\alpha \lambda^\beta + C$$

and the specific pull-out energy is defined by the equation, $$\psi_{peak} = \frac{4E_{peak}}{\pi d_f^2} = k_2 a_o^\alpha \lambda^\beta + C_1$$

said fiber additives having an optimum deformity, $$D_{optimum} \approx (0.5 \text{ to } 1) D_{critical},$$

$D_{critical}$ being that deformity where the ultimate tensile strength of the fiber equals $k_1 D_{critical} + C$, and where loads are measured in N; energy in N-mm; length dimensions are in mm, and the values of $k_1$, $k_2$, C and $C_1$ are determined based upon the ultimate tensile strength of the fiber and by plotting deformation versus pull-out stress to obtain the value for $D_{critical}$.

2. Fiber additives, as in claim 1, wherein said plurality of fibers are selected from the group consisting of polyolefins; polyesters; polyvinyl chloride; polyvinylidene chloride; polyamides; polyacrylics and mixtures thereof.

3. Fiber additives, as in claim 1, wherein said plurality of fibers are polypropylene, having an ultimate tensile strengh of 450 MPa and where $k_1$=2300; $k_2$=12300; C=27.5 and, $C_1$=186.

4. Fiber additives, as in claim 1, wherein said plurality of fibers have a diameter of from 0.6 to about 0.8 mm, an amplitude of from 0.5 $d_f$ to about 1 $d_f$ and a period of from 4 $d_f$ to about 7 $d_f$.

5. Fiber additives, as in claim 1, wherein said plurality of fibers have a diameter of 0.76 mm, an amplitude of 0.52 mm and a period of 3.9 mm.

6. Concrete having improved crack resistance comprising:

concrete; and from about 0.25 to about 5 percent by volume of sinusoidally configured thermoplastic fibers having a profile geometry defined by the equation, $$y = a_0 \sin\left(\frac{2\pi x}{\lambda}\right)$$

wherein the amplitude $a_0$ falls within a range of from about 0.1 $d_f$ to 2 $d_f$ and the period $\lambda$ falls within a range of from about 2 $d_f$ to 15 $d_f$ for fibers having a diameter $d_f$ of from about 0.5 to about 1 mm; the peak pull-out stress $\sigma_{peak}$ and the specific pull-out energy absorbed to a maximal displacement of 7.5 mm $\psi_{peak}$, both increase linearly with a deformity factor defined by the equation, $$D = a_o^\alpha \lambda^\beta$$

where $\alpha$=0.8 and $\beta$=−1, such that the peak pull-out stress is defined by the equation, $$\sigma_{peak} = \frac{4P_{peak}}{\pi d_f^2} = k_1 a_o^\alpha \lambda^\beta + C$$

and the specific pull-out energy is defined by the equation, $$\psi_{peak} = \frac{4E_{peak}}{\pi d_f^2} = k_2 a_o^\alpha \lambda^\beta + C_1$$

said fiber additives having an optimum deformity, $$D_{optimum} \approx (0.5 \text{ to } 1) D_{critical},$$

$D_{critical}$ being that deformity where the ultimate tensile strength of the fiber equals $k_1 D_{critical} + C$, and where loads are measured in N; energy in N-mm; length dimensions are in mm, and the values of $k_1$, $k_2$, C and $C_1$ are determined based upon the ultimate tensile strength of the fiber and by plotting deformation versus pull-out stress to obtain the value for $D_{critical}$.

7. Concrete, as in claim 6, wherein said plurality of fibers are selected from the group consisting of polyolefins; polyesters; polyvinyl chloride; polyvinylidene chloride; polyamides; polyacrylics and mixtures thereof.

8. Concrete, as in claim 7, wherein said plurality of fibers comprise polypropylene having an ultimate tensile strengh of 450 MPa and where $k_1$=2300; $k_2$=12300; C=27.5 and, $C_1$=186.

9. Concrete, as in claim 6, wherein said plurality of fibers have a diameter of from 0.6 to about 0.8 mm, an amplitude of from 0.5 $d_f$ to about 1 $d_f$ and a period of from 4 $d_f$ to about 7 $d_f$.

10. Concrete, as in claim 6, wherein said plurality of fibers have a diameter of 0.76 mm, an amplitude of 0.52 mm and a period of 3.9 mm.

11. A method for improving the bond slip performance of fibers in concrete comprising the steps of:

adding to a selected amount of concrete, from about 0.25 to about 5 percent by volume, of sinusoidally configured thermoplastic fibers having a profile geometry defined by the equation, $$y = a_0 \sin\left(\frac{2\pi x}{\lambda}\right)$$

wherein the amplitude $a_0$ falls within a range of from about 0.1 $d_f$ to 2 $d_f$ and the period $\lambda$ falls within a range of from about 2 $d_f$ to 15 $d_f$ for fibers having a diameter $d_f$ of from about 0.5 to about 1 mm; the peak pull-out stress $\sigma_{peak}$ and the specific pull-out energy absorbed to a maximal displacement of 7.5 mm $\psi_{peak}$, both increase linearly with a deformity factor defined by the equation, $$D = a_o^\alpha \lambda^\beta$$

where $\alpha$=0.8 and $\beta$=−1, such that the peak pull-out stress is defined by the equation, $$\sigma_{peak} = \frac{4P_{peak}}{\pi d_f^2} = k_1 a_o^\alpha \lambda^\beta + C$$

and the specific pull-out energy is defined by the equation, $$\psi_{peak} = \frac{4E_{peak}}{\pi d_f^2} = k_2 a_o^\alpha \lambda^\beta + C_1$$

said fiber additives having an optimum deformity, $$D_{optimum} \approx (0.5 \text{ to } 1) D_{critical};$$

$D_{critical}$ being that deformity where the ultimate tensile strength of the fiber equals $k_1 D_{critical} + C$, and where loads are measured in N; energy in N-mm; length dimensions are in mm, and the values of $k_1$, $k_2$, C and $C_1$ are determined based upon the ultimate tensile strength of the fiber and by plotting deformation versus pull-out stress to obtain the value for $D_{critical}$; and mixing said components sufficiently to distribute said fibers uniformly throughout said concrete, whereby energy absorption capability of concrete is improved as compared to concrete reinforced by fibers having a geometry other than said geometry.

12. A method, as in claim 11, wherein said pluralities of fibers are selected from the group consisting of polyolefins; polyesters; polyvinyl chloride; polyvinylidene chloride; polyamides; polyacrylics and mixtures thereof.

13. A method, as in claim 12, wherein said plurality of fibers are polypropylene having an ultimate tensile strengh of 450 MPa and where $k_1=2300$; $k_2=12300$; $C=27.5$ and, $C_1=186$.

14. A method, as in claim 11, wherein said plurality of fibers have a diameter of from 0.6 to about 0.8 mm, an amplitude of from 0.5 $d_f$ to about 1 $d_f$ and a period of from 4 $d_f$ to about 7 $d_f$.

15. A method, as in claim 11, wherein said plurality of fibers have a diameter of 0.76 mm, an amplitude of 0.52 mm and a period of 3.9 mm.

* * * * *